July 23, 1963

J. L. MICHAELIS 3,098,963

METHOD AND APPARATUS FOR CONTROLLING A DIRECT
CURRENT POWER SOURCE

Filed Aug. 25, 1958

INVENTOR.
JOHN L. MICHAELIS

BY Oscar L. Spencer

ATTORNEY

July 23, 1963 J. L. MICHAELIS 3,098,963
METHOD AND APPARATUS FOR CONTROLLING A DIRECT
CURRENT POWER SOURCE
Filed Aug. 25, 1958 4 Sheets-Sheet 3

INVENTOR.
JOHN L. MICHAELIS
BY Oscar L Spencer
ATTORNEY

INVENTOR.
JOHN L. MICHAELIS
BY Oscar L. Spencer
ATTORNEY

United States Patent Office 3,098,963
Patented July 23, 1963

3,098,963
METHOD AND APPARATUS FOR CONTROLLING A DIRECT CURRENT POWER SOURCE
John L. Michaelis, Pittsburgh, Pa., assignor, by mesne assignments, to Pittsburgh Plate Glass Company
Filed Aug. 25, 1958, Ser. No. 756,824
19 Claims. (Cl. 321—11)

This invention relates to methods and apparatus for providing direct current at amperages in excess of 10,000 amperes, usually above 20,000 amperes and frequently above 80,000 amperes, at voltages in the range of 100 to 500 volts or above from an alternating current power source. It is especially adapted for supply of direct current to a series of electrolytic cells such as a series of alkali metal chloride cells which are used for the production of chlorine and caustic soda or to a series of electrolytic cells used for the production of aluminum or magnesium metal by electrolysis of a fused bath of aluminum salts or magnesium salts.

The present invention permits use of semiconductor rectifier diodes which operate at power efficiencies in excess of 98 percent and which have relatively low internal resistance, generally below about 0.02 ohm. Such rectifier diodes have internal voltage drops below one volt frequently in the range of 0.42 to 0.54 volt. By use of such semiconductor rectifier diodes as herein contemplated, a substantial saving in power is effected. Rectifiers of the type herein contemplated are those which rely upon the semiconductor properties of certain metalloids such as metallic germanium or silicon.

The unusually low resistance and high efficiency of semiconductor rectifiers such as the germanium and silicon rectifier diodes makes their use attractive. However, individual diodes can supply only a small amount of current in the range of about 50–500 amperes. Hence, it has been found that it is necessary to use a large number of such diodes coupled in parallel to meet the high current demand, and in series for higher voltage ratings. The rectifier systems herein contemplated contain at least 100 of the rectifier diodes so connected and may contain over 5,000 of such diodes or like units.

One of the problems encountered in such a case, however, is the unusually low internal resistance of germanium and like diodes. Inevitably, the various rectifier diodes which are coupled together vary in the magnitude of their internal resistance. The variation in terms of internal voltage drop from diode to diode is below plus or minus 0.25 volt, usually plus or minus about 0.05 volt. Consequently, when connected in parallel, those rectifiers in the parallel circuit having materially lower resistances than the others pass a disproportionate share of the load current and may become inefficient or inoperative due to overload and subsequent failure.

A further difficulty which arises in the use of semiconductor rectifiers such as contemplated here is the problem of voltage surges, of high magnitude, short duration which may be created by lightning, switching operations and the like. There is a serious danger that sudden overload and failure of one diode in a system may cause a successive series of failures of other diodes until all or most of the diodes have failed. Failure of this type could be seriously expensive.

The present invention affords a simple and convenient means for avoiding these difficulties. According to this invention, an alternating current power supply is coupled in parallel with a plurality of circuits each containing at least one semiconducting rectifier diode having an internal resistance below 0.02 ohm, such as a germanium or silicon diode, each circuit preferably containing several such diodes in series. Also in series with each parallel rectifier circuit containing either a single diode or series of diodes, on the alternating current side thereof is a small electromotive force. The magnitude of this electromotive force normally is quite small, frequently being of the order of 0.2 to 0.3 volt or less per rectifier element or diode and is such that it adds to or subtracts from the impressed alternating current voltage an amount of electromotive force sufficient to compensate for the differences in internal resistance between the diodes in parallel and thereby to balance the circuits and to avoid overloading of individual rectifier diodes.

Failure of the diodes due to sudden increases in alternating current in voltage such as may be caused by lightning is avoided or minimized by maintaining an electrolytic cell, as an electrical load, across the output direct current load circuit. Such a cell, when uninterruptedly connected to a rectifier power source, is rapidly responsive and sensitive to any voltage surge such that a substantial increased current flow results from a small percentage voltage increase. The cell thus serves as a voltage surge arrestor. Cells of the type contemplated are alkali-chlorine electrolytic cells such as used for production of sodium hydroxide and chlorine or large electrolytic cells used for electrolysis of magnesium and aluminum salts to produce metallic aluminum and magnesium. They usually are capable of operating at amperages in excess of 10,000 amperes, preferably 20,000 to 80,000 amperes and may form all or only a part of the load on the direct current source.

To avoid current overload each individual bridge or circuit comprising a series of diodes has an individual fuse responsive to overload current for breaking the current whenever the current exceeds a predetermined value. Automatic overload circuit breakers are provided on the alternating current side of the system rather than on the direct current side. This is to avoid disconnection of the electrolytic cell or cells from the diodes, and subsequent loss of surge voltage protection to the diodes.

The invention may be more fully understood by reference to the ensuing disclosure taken in connection with the acompanying drawing in which.

Figure 1:
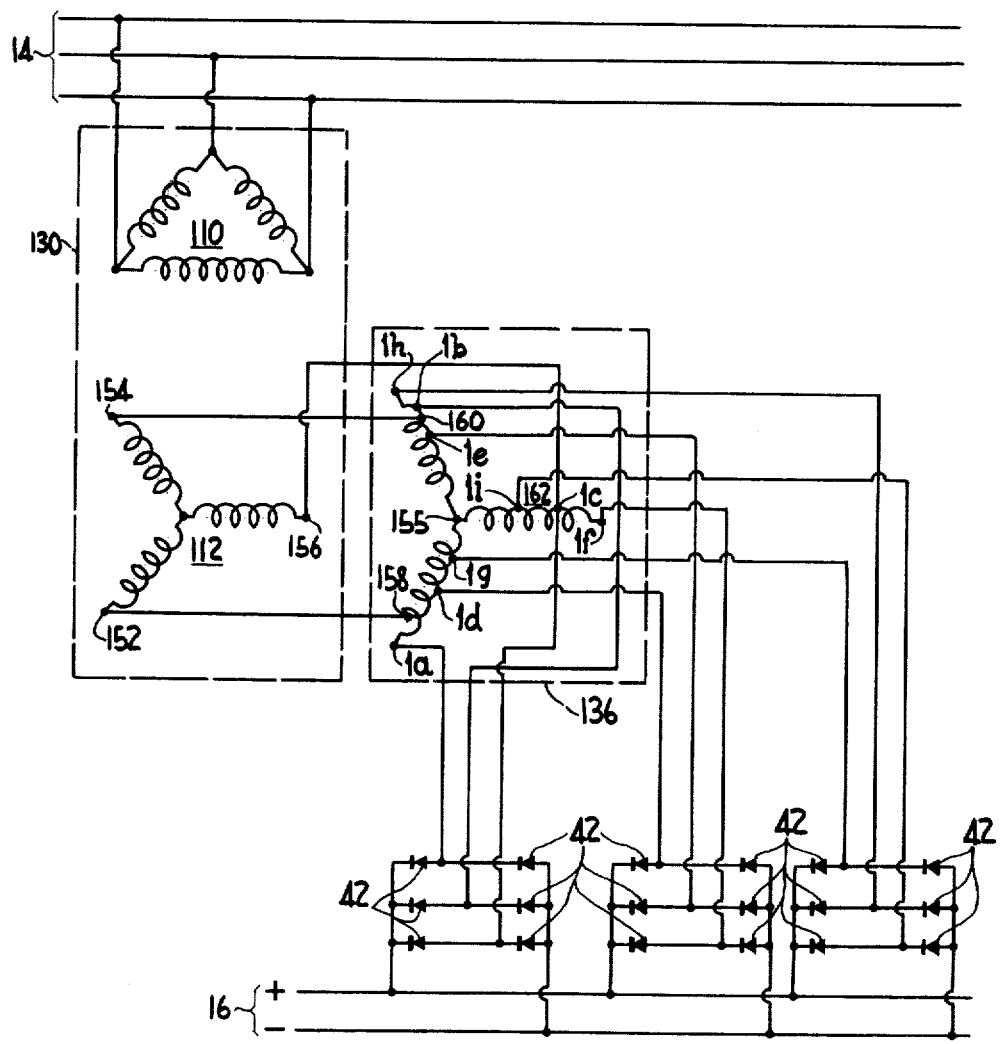
FIG. 1 is a diagrammatic illustration of a balancing autotransformer associated with a power transformer and three bridge circuits.

In the practice of one of the embodiments of this invention, a system is employed which comprises a relatively large number of a balanced alternating current outputs, each of these outputs being used to energize a single rectification circuit. The rectification circuit may consist of a single diode or a bridge circuit employing a plurality of diodes in series of a plurality of such bridge circuits in parallel. All of these rectification circuits supply the common load.

If all the alternating current outputs were maintained at an equal potential, each rectification circuit fed therefrom would be forced to carry a more equal share of the load current. Such a number of alternating current outputs at satisfactory voltages are obtained in the present system from a plurality of transformers or a plurality of windings on the same transformer. It is not practical, however, with ordinary transformers alone to achieve any high degree of identity to output voltage without going to extra expense in manufacture. Induced voltages will vary slightly from winding to winding; and, furthermore, the differences in transformer internal impedance as seen by the load become especially important. Ordinary transformers will match impedances within 7½ percent if the transformers are manufactured to identical mechanical and electrical specifications. If one transformer is wound with a number of secondary windings, it is still difficult to match the impedances of the secondaries within 5 percent without extra manufacturing costs. Furthermore, if it is desired that the secondaries feed rectifiers having somewhat unforeseen characteristics with identical currents, manufacturing exactness of the antecedent transformers will not achieve the desired result.

When a plurality of transformers are used to supply the alternating current power for rectification the variation from transformer to transformer may be dealt with by providing a plurality of taps off the primary or secondary winding so that the output of the transformer may be at different voltages depending upon the voltages between taps. By providing a number of taps which have relatively small voltages therebetween, it is possible to couple all of the transformers at identical voltage output simply by selecting the proper taps from each transformer.

In any event whether one or many secondary windings are used, there is provided according to this invention, a balancing electromotive force in series with each parallel rectifier bridge in order to compensate for variation in rectifier internal resistance from one diode to another or from one series of diodes to another series. An effective balancing apparatus for practice of this invention includes an autotransformer energized by alternating current of frequency and phase substantially identical with that of the alternating current source. This autotransformer has a number of tapped connections wherewith portions of the autotransformer may be connected serially with the several rectifier diodes and the windings of the power source. It is preferable and economical to employ a three-phase alternating current source and a three-phase autotransformer in this system, although single-phase systems are also practical. The alternating current source employed would ordinarily be a transformer, but could conceivably be an alternating current generator or other source.

The electromotive balancing system will be described with reference to FIG. 1 of the accompanying drawing which shows an embodiment of the invention wherein an autotransformer is connected to the output of an alternating current source and has various taps thereon for supplying rectification circuits.

In this embodiment, there is provided a three phase alternating current transformer 130 having a primary winding 110 and a secondary winding 112. The primary winding is here shown delta connected, and the secondary winding is shown star connected; but any arrangement of three-phase windings might be employed giving the desired voltage output at terminals 152, 154 and 156. Across these latter terminals is connected a tapped three-phase autotransformer 136 providing both stepped-up and stepped-down voltages. Both step-up and step-down is achieved by placing input terminals 158, 160 and 162 between the common neutral connection 155 of the windings and the extremities thereof. The lettered taps shown on the autotransformer are representative of any number of selective taps placed on the autotransformer windings so that desired voltages may be obtainable. A three-phase rectification circuit employing diodes 42 is shown connected to taps 1–*a*, 1–*b* and 1–*c* on the autotransformer. Another rectification circiut is supplied from 1–*d*, 1–*e* and 1–*f*, while a third rectification circuit is shown supplied from taps 1–*g*, 1–*h* and 1–*i*. The rectification circuits shown here are six-element bridge circuits as in the previous figures. The bridge circuits supply a common direct current line 16 for energizing a load. The number of rectification circuits here employed is merely representative of the many more which may be used.

In the operation of the circuit illustrated in FIG. 1, desired alternating current voltages are supplied to the rectification circuits composed of diodes 42, and the exact voltages (which may comprise a number of individual diodes connected in series) applied are governed by the settings of selective taps 1–*a* to 1–*i* inclusive which add to or subtract from the voltages supplied from the terminals 152, 154 and 156. Thus, diodes or series of diodes having a low forward resistance may properly be supplied with a lower input voltage than diodes having a higher forward resistance. The autotransformer taps can be arranged such that all diodes or series of diodes 42 carry substantially the same share of load current.

In the illustrated embodiment of FIG. 1 there is shown one three-phase transformer. It will be understood that a plurality of such transformers may be used to feed pluralities of bridges all of which have their direct current outputs connected in parallel. Moreover, the three-phase units can be replaced by single-phase units.

For the sake of simplicity, the drawing of FIG. 1 illustrates but one diode in a single circuit. Generally, however, a plurality of such diodes are connected in series in order to supply direct current at a voltage of several hundred volts. Moreover, in the usual system a plurality of series of diodes are coupled with each terminal 152, 154 and 156, the several series being coupled in parallel. Each such series is coupled with an electromotive force which adds to or subtracts from the impressed voltage to compensate for variation in the forward internal resistance of the diodes or bridge of a series of such diode, from diode to diode, or from bridge to bridge.

The magnitude of such electromotive force per diode is small rarely exceeding 0.3 volt per diode and usually being in the range of about 0.05 volt. Where bridges comprising pluralities of diodes are used, the electromotive force required is, of course, dependent upon the vectorial sum of the variations of the several diodes in the bridge and may be quite small or quite large.

A specific example will more clearly illustrate this embodiment of the invention.

*Example I*

A typical installation is to supply direct current electric power at 45,000 amperes and 250 volts. With 150 ampere rated rectifier diodes each three-phase bridge will provide 450 amperes output. Thus 100 bridges are required in parallel each rated 450 amperes to provide 45,000 amperes total output.

This 45,000 amperes at 250 volts output or 11,250 kilowatts will require an alternating current power input of 11,250 kilowatts plus losses. These losses will be neglected to simplify discussion. The alternating current voltage input required is about 190 volts three-phase to provide the 250 volts direct current output.

Each bridge requires 112.5 alternating current kilowatts input at 190 volts, three-phase, or 342 alternating current amperes. The 100 bridges require an alternating current input current of 34,200 amperes.

Usually commercial germanium diodes today will withstand an inverse peak voltage of 90 volts. In this example, five diodes are connected in series per leg of a bridge circuit for 250 volts direct current output voltage. Thus, actually 30 diodes are required for a six-element bridge as shown.

The supply alternating current to those 100 bridges could be supplied by:

A. 100 transformers each providing 342 alternating current amperes at 190 volts.
B. 10 transformers each providing 3420 alternating current amperes at 190 volts.
C. 1 transformer providing 34,200 alternating current amperes at 190 volts.

When ten transformers are used, ten rectifier bridge circuits are supplied power from one transformer winding.

High efficiency germanium rectifier diodes have internal voltage drops ranging from 0.42 volt to 0.54 volt. In addition the lead length and resistance of connections may be unequal. With ten parallel circuits, careful selection of diodes of equal internal resistance would permit paralleling and thus equal load division. But careful matching of equal internal resistance diodes cannot compensate for variations in connection lead lengths, nor is the problem ended from a maintenance viewpoint when replacements are required, since a stock of spare diodes must be available to permit replacement with an exact value internal resistance diode.

This illustrates the desirability of a balancing circuit that shall force the ten parallel circuits to equally divide load with diodes of unequal internal resistance, connection leads of unequal impedance and electrical connections of the leads and diodes of unequal resistance.

To accomplish equal load division, a small potential is placed in series with each of the ten parallel bridge circuits composed of germanium diodes.

An autotransformer similar to that shown in the drawing provides a vectorially additive or substractive potential in conjunction with the rectifier power transformer. Thus, each of the bridge circuits is supplied alternating current power from the rectifier power transformer 130 but any one of seven taps are available as vernier adjustment voltages to force the diodes to equally divide load.

In any three-phase transformer the sum of the alternating currents equals zero. However, one-phase may carry slightly more load direct current from the rectifiers. This unbalance may result in a direct current residual current in the balancing autotransformer. To minimize any direct current saturation of the balancing autotransformer, an air gap (50 one-thousandths of an inch in width), is provided in the iron circuit.

Experiments have shown with no balancing device the current flow in the ten parallel diodes will vary approximately 40 percent from the high to low current, with presently commercially available diodes.

On the initial assembly and testing of the rectifier assembly a clamp-on type ammeter may easily determine the high and low current circuits. The alternating current connection from the bridge may be quickly moved to one or two higher or lower autotransformer potential taps to equalize the output current. Once the ten parallel circuits are balanced within the desired tolerance, the connections may remain on that specific autotransformer tap. If in the future a diode is replaced, then the balance may be altered due to a significant change in the internal resistance of the new diode compared to the former diode. An autotransformer potential tap may be selected that will provide the desired output current.

This balancing autotransformer is small electrically and in physical size, that is, say 3,000 amperes at 0.14 volt is 420 volt amperes but only a reduced ampere capacity at the end taps is required. Thus, overall this transformer may be about 0.2 k.v.a. and relatively low in cost, especially since three 0.2 k.v.a. transformers are required for the one 1,125 k.v.a., three-phase rectifier power transformer. The unbalanced potential in the ten parallel cricuits is small and it is impractical to provide 100 power transformers of this type installation.

Balancing is required between the ten 1,125 k.v.a. power transformers because of their unequal impedance. Six ¼ of 1 percent taps are suggested on the primary winding of these ten power transformers to permit adjustment that will provide equal load carrying capability for each of these ten power transformers.

While an autotransformer effectively serves to supply the balancing potential herein sought, other means of supplying such potential may be resorted to within the purview of this invention. Thus, in lieu of an autotransformer, a transformer having primary and secondary windings energized independently of transformer 130 may be used. In such a case, pluralities of taps from the secondary winding are provided to supply the small balancing electromotive force required.

Another problem encountered in the operation of the rectifying system as hereinbefore described with which the invention is concerned is one involving a control of the individual rectifying units employed in the system. Semiconducting rectifying units such as germanium or silicon rectifier diodes are extremely sensitive to increases in temperature caused by overloading or lack of ample cooling such that after short periods of time in operation, increases in temperature above certain values will result in failure or destruction of the rectifiers.

The reverse polarity leakage current of a semiconducting diode, such as a germanium rectifier, is quite small at normal rated temperatures. As temperatures increase due either to overloading or inadequate cooling the reverse polarity current greatly increases to a value such that this reverse current flow will destroy the diode. It is therefore extremely important in the operation of a rectification system employing semiconducting type rectifier diodes that adequate cooling of the individual rectifier diodes be provided for. In addition to supplying a cooling medium at a rate and temperature sufficient to maintain the individual germanium diodes within certain temperature ranges, it is equally important that the cooling be uniform for reasons to be hereinafter more fully explained.

Some presently available commercial semiconducting rectifier diodes are rated at 150 amperes direct current at 66 inverse alternating current volts. Germanium rectifier diodes of this type are factory tested at, and operate efficiently at total internal temperatures of 65° C. Because of the extreme sensitivity of elements of this type this 65° C. total internal temperature should not be exceeded during the operation of the rectification system. For that matter, it is desirable to maintain the total internal temperatures of the individual germanium diodes employed in the system about 50° C. to 60° C., preferably in the vicinity of 55° C. In order to achieve maximum safety and efficiency therefore, it is necessary that the cooling system be so regulated that the individual germanium diodes are maintained at a total internal temperature below about 65° C.

According to the present invention, high efficiency is maintained without overheating the rectifier units by maintaining the temperature of all of such units in a plurality of circuits within a limited temperature range not larger than about 5° C. Thus, the temperature differential between the coolest operating rectifier and the warmest operating rectifier in the system should not exceed this 5° C. and preferably should be less than 3° C.

To effect this result and to maintain the temperature of all the units substantially the same, i.e., temperature differential between hot and cold not over about 5° C., the rectifier units should be cooled in parallel. Thus each of the units should be cooled with cooling fluid which flows from a common source past but a single rectifier diode or unit and then to a cooling zone for removal of heat absorbed by the coolant from the rectifier unit.

Since the rectification system hereinbefore described contemplates utilization of large numbers of individual germanium diodes, air cooling is preferred. In addition to maintaining the internal temperature of the germanium diodes below 65° C. by the cooling system of the present invention, it is also important that no appreciable temperature differential be allowed between individual germanium diodes in the overall system.

Appreciable temperature differential between individual germanium diodes cause changes in the internal resistance of such rectifiers, for example, between two individual germanium rectifiers a 9° C. temperature differential between them will cause the hotter unit to carry 3 percent more current than the cooler unit since an increase in temperature lowers the internal forward voltage drop of the germanium rectifier.

The preferred embodiment of the present invention is therefore designed to operate in such a manner that each rectifier diode used in the rectification system is cooled substantially to the same extent with no appreciable temperature differential occurring in any one rectifier cubicle or cabinet between individual operative rectifier diodes or between operative rectifier diodes mounted in different cabinets where several cabinets are required for a large installation. If the rectifier diodes used in the system of the type contemplated by this invention were cooled by passing air in contact with a series of the units, cooling would not be uniform. The rectifying diodes first contacting the air will be cooled to the greatest extent. Those at the exit end of the rectifying cabinet would be cooled to the least extent since the cooling air would be progressively heated on its passage through the cabinet. In order to insure adequate cooling of the last rectifier diodes encountered by the cooling air in this type of system, it is necessary that air be circulated at a rapid rate and at relatively cold temperatures. Furthermore, even if cooling air is supplied at temperatures and rates sufficient to cool the last diode in the series to the desired temperatures in a system of this nature, there would still exist a temperature differential between the first diode encountered by the cooling air and the last. As pointed out hereinabove, this temperature differential results in decreasing the internal resistance of the rectifier diodes in the system by varying amounts, and in introducing a hot diode at the bottom of the cabinet which will tend to carry more than its share of the load, causing the operation of the system to be altered or derated by the amount of the decrease in the internal resistance of the hottest diode so as to off-set its tendency not to share the load.

The cooling herein contemplated is achieved by circulating a fluid coolant, such as air, nitrogen and the like at a predetermined temperature, to rectifier cabinets so that each rectifier diode housed within the cabinet or on the outside of the cabinet, is cooled to substantially the same temperature. In order to accomplish this, it is necessary to provide a coolant circulation system which is so to speak, in parallel with each rectifier diode contained within an individual rectifier cabinet. This is accomplished by establishing a positive pressure on one side of a rectifier cabinet and a lower pressure on the other side, and passing the coolant through the cabinet in such a manner that, as it passes one individual rectifier diode within the cabinet in heat removal contact therewith it is recycled to the coolant circulation system. In this way, each of the germanium diodes contained within the cabinet is cooled substantially to the same degree of temperature so that the temperature differential existing between any two rectifier diodes within a single cabinet or a plurality of cabinets is between about 0° C. and 5° C., preferably below 3° C., and consequently all will tend to carry an equal share of the load.

Figure 7:
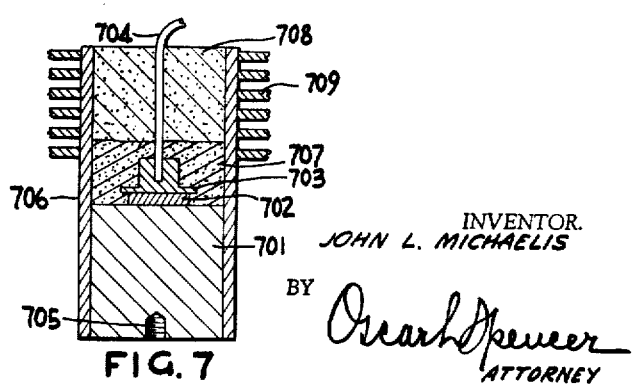
FIG. 7 is a diagrammatic illustration of a germanium rectifier diode suitable for use in the rectification system.

The germanium diode of FIG. 7 is illustrative of a rectifier suitable for use in the system of the present invention. These diodes are comprised of a base 701 of copper or other suitable metal having high heat transfer capability. The germanium junction 702 is fused to the base member and is comprised of a germanium wafer and an indium pellet intimately fused together. A copper electrode 703 is fused to the germanium wafer and has imbedded in it the electrical cable 704. Base member 701 is provided with a tapped bore 705 for electrical connection of the base of the diode. A wax plug 707 is provided around the electrode and the germanium junction to provide flexibility in this section of the diode assembly and the diode is sealed by an epoxy resin seal 708 to prevent any water from entering the diode. The diode is enclosed in a housing 706 of copper or other suitable metal which contains a plurality of extruded cooling fins 709 on its external surface. In a construction of this type heat is quickly dissipated from the germanium junction 702 to the base member 701. From the base member 701 the heat is rapidly transferred to the housing 706 and cooling fins 709 where it can be easily removed by contacting the fins with an appropriate coolant.

Figure 2:
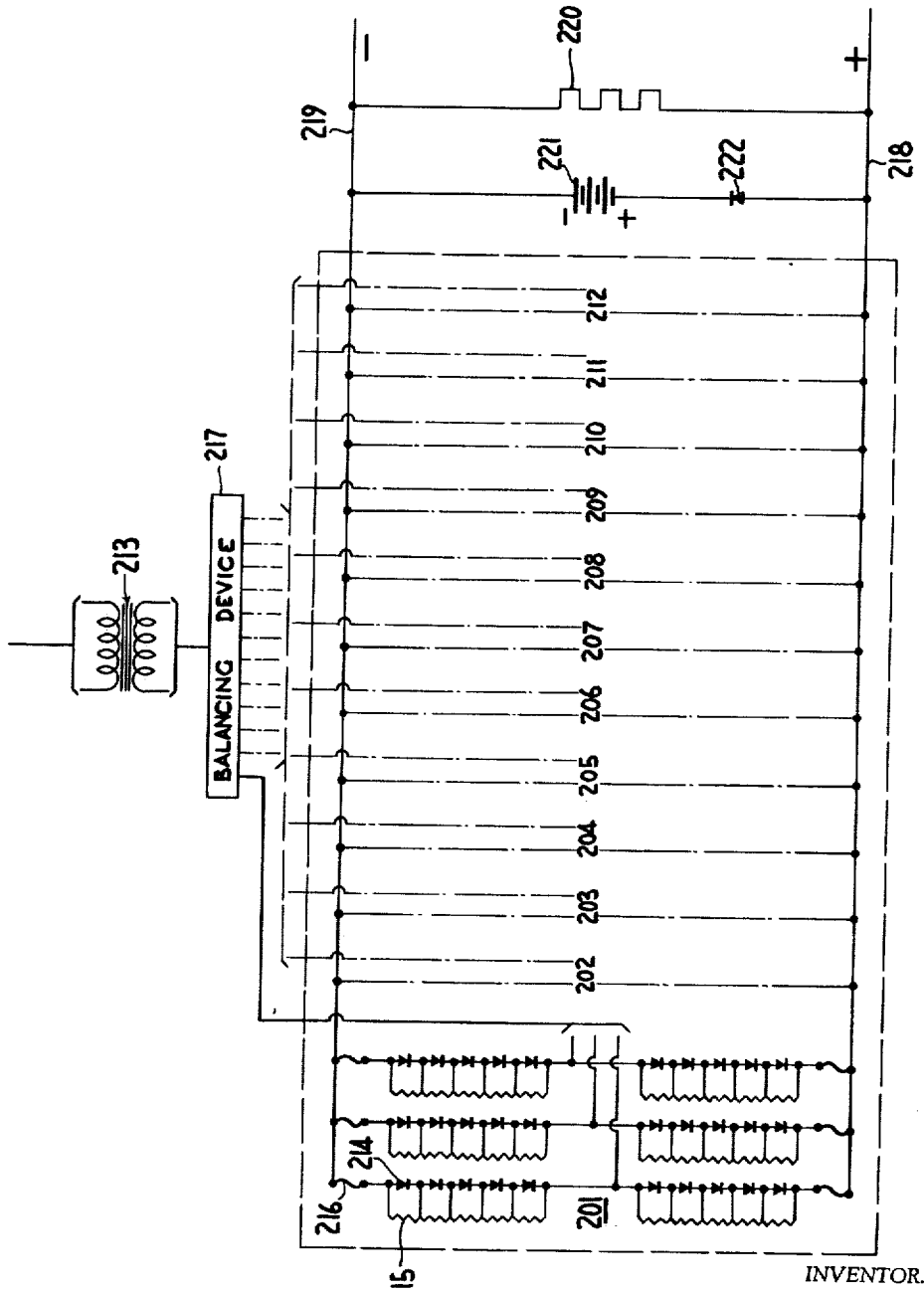
FIG. 2 is a diagrammatic illustration of a suitable circuit arranged to provide the desired rectification and having incorporated therein a voltage surge arresting system for protection of the diodes from sudden voltage surges.

In FIG. 2 are shown twelve bridge circuits numbered 201 through 212 consecutively, connected to a power transformer 213. The semiconducting rectifier diodes 214 are arranged thirty in a bridge circuit in the illustration though this may be varied so long as each bridge circuit contains the same number of diodes in each leg of each bridge. Connected in shunt across each diode are 500 ohm resistors 215, said resistors being in series with each other. Though the resistors are shown only across the diodes of one leg of bridge 201, it is to be understood that this same system of resistors is placed across each diode and leg of all the bridge circuits shown.

At the direct current terminals of each bridge leg between the last diode in a series and the direct current leads or bus bars are located fuses 216. Connected in series with the power transformer is an electrical balancing system 217. The bridge circuits are connected in parallel and contain pluralities of semiconducting rectifiers connected in series.

Figure 3:
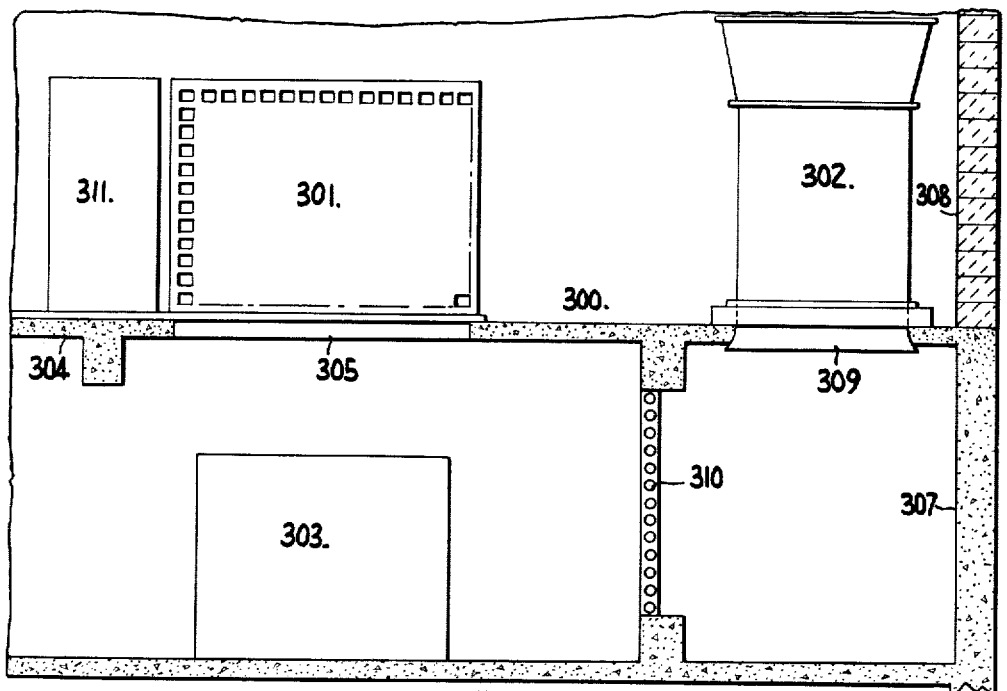
FIG. 3 is a diagrammatic illustration of the cooling circulation system employed in the rectifier system.

FIG. 3 illustrates the rectifier building 300 comprising the room and air circulation system generally. The room 300 is divided into two floors, the upper floor 308 mainly used to house rectifying cabinets 301 and fan 302. The lower floor 307 serves to house the power transformer 303, cooling coils or other cooling unit 310 and serves as a plenum for the circulating air moved by fan 302.

Rectifier cabinets 301 are six-sided, cubicle structures which are closed on five sides but open at the bottom. These cabinets are mounted in room 308 over openings 305 in the floor separating room 308 from basement 307. Rooms 307 and 308 communicate with each other also through opening 309 below fan 302. Except the openings above referred to, room 308 and room 307 are closed with respect to each other. Positioned on the lateral walls of the rectifier cubicles or cabinets 301 are a plurality of apertures or orifices 306. These openings are shown positioned on the lateral walls of a cubicle, the ends and top of the cubicle being closed. Associated with the rectifier cabinet is a switch box. All connections from the transformer and switch to the units have been omitted from the drawing.

Figure 4:
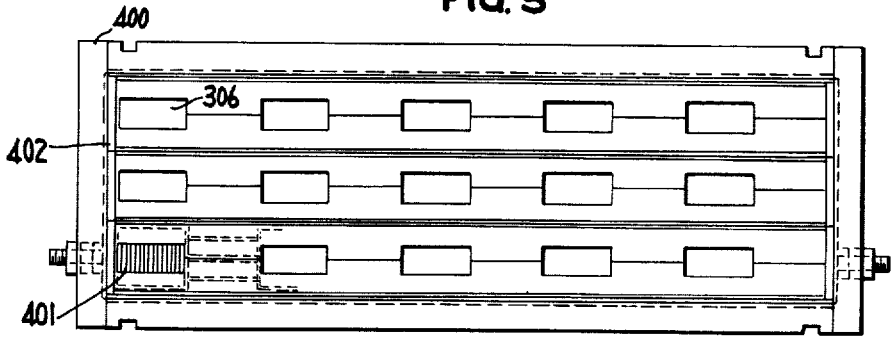
FIG. 4 is a side view of a rectifier assembly showing the air orifices of fixed size.
Figure 5:
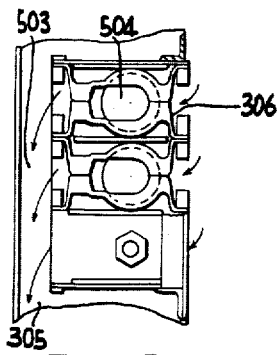
FIG. 5 is an end view partially broken away to show the cooling fins of a rectifier diode.

In FIG. 4, number 400 generally indicates the lateral wall of a rectifier cabinet. Number 402 designates an assembly of germanium diodes. Number 306 indicates the air orifices associated with the individual germanium rectifier diodes mounted on assembly 402. As can be seen from the drawing, assembly 402 carries 15 individual germanium diodes contained in three rows with 5 buttons connected in series in each of the three rows. When mounted on the cabinet wall each germanium diode carried by the assembly unit is so placed that it is in juxtaposition to an air space or orifice 306. Number 401 indicates the cooling fin of a germanium rectifier diode placed in position on an assembly 402 so that the cooling fins are directly opposite a cooling orifice. As can be seen more clearly in FIG. 5, circulating air passing through aperture 306 passes in heat exchange relationship with a rectifier 504 and into a common air passage 503 from which it travels downwardly through opening 305 to the air space or plenum located below the rectifier room.

In the construction of the rectifier cabinets each cabinet carries on its lateral walls a plurality of orifices of fixed size so that each rectifier cabinet in the overall rectification system carries orifices on its lateral walls of substantially identical dimension. As indicated above, the rectifier room, with the exception of the openings in the rectifier cabinets at the bottom thereof and the opening at the fan mounting, is closed to the basement of the building. The purpose of this closed air circulation system is to keep dust and contamination to a minimum so that the surfaces of the cooling fins on the germanium rectifiers will remain clean and operate with maximum heat transfer efficiencies. In the operation of the system of FIG. 3, fan 302 is energized and establishes a positive pressure in room 308, a lesser pressure being etsablished in room 307. Because of the pressure differential existing between the rectifier room and the space below, air passes through fixed orifices 306 down through the center of the rectifier cabinets into room 307 and is drawn by the fan 302 over cooling coils 310 back up through opening 309 into the rectifier room once again. In this way the cooling air as it passes through orifices 306 cools one rectifier and immediately enters the recirculation system.

The following example is given to show the operation of the cooling system as employed in a typical installation adapted to supply direct current electric power at 118,800 amperes and 250 volts.

*Example II*

A typical illustration is to supply direct current electric power at 118,800 amperes, 250 volts. With 150 ampere size rectifier junctions, each three-phase bridge will provide 450 amperes output. Thus 264 bridges are required in parallel each rated 450 amperes to provide 118,800 amperes total output.

To supply 118,800 amperes, 250 volts will require an alternating current power input of 29,700 kilowatts plus losses. These losses will be neglected to simplify discussion. The alternating current voltage input required is about 190 volts three-phase to provide the 250 volts direct current desired.

Each bridge requires 112.5 alternating current kilowatt input of 190 volts, three-phase or 342 alternating current amperes. The 264 bridges require an alternating current input of 90,288 amperes. In this system 22 cabinets are employed with each cabinet containing 12 bridges. Each bridge contains six legs with five diodes connected in series per leg for 250 volts direct current output voltage. Thus, 30 diodes are required for each six element bridge. From this it can be seen that each rectifier cabinet will contain 360 germanium rectifier diodes.

For convenience in mounting such large numbers of germanium rectifiers per cabinet sub-assemblies are provided which carry 15 germanium diodes per sub-assembly. Each sub-assembly is of rigid construction and is provided with 15 slots or nests in which the germanium rectifiers set. When in position on the sub-assemblies the germanium rectifiers are so placed that their cooling fins project from either side thereby permitting cooling air, free circulation from one surface of the sub-assembly to the other surface of the sub-assembly past the germanium cooling fins.

The cabinets in which the germanium sub-assemblies are mounted consist of a top and a bottom, two end sections and two lateral walls. The surfaces of the top section of the rectifier cubicle are closed as are the surfaces of the end portions. The surface or skin of the lateral walls of the rectifier cabinet contain a plurality of rectangular orifices therein. In this particular embodiment each lateral wall surface contains 180 orifices so that the total number of orifices on each cabinet is 360. The sub-assemblies are mounted in such a manner so that each row of five buttons on an assembly is parallel to the length of the cabinet wall and each row of three buttons on an assembly will be parallel to the height of the cabinet walls. In addition to this, sub-assemblies are so arranged that each individual button carried by a sub-assembly is in juxtaposition to an opening or orifice in the cabinet wall surface so that when the assembly is completed, the 360 buttons carried by each cabinet will be positioned directly opposite one of the apertures or orifices located on the surface of the cabinet wall.

The twenty-two rectifier cabinets employed in the system are mounted in the rectifier room over twenty-two openings in the floor thereof cut roughly in size corresponding to the dimensions of the bottom of the rectifier cabinet. Below the rectifier room is a basement room corresponding in size to the area of the rectifier room. Located within the basement are the power transformers and the electrical connections leading from the transformers to the elements contained in the rectifier cabinets. Located at one end of the basement near the fan mounting are finned cooling coils through which water is circulated at temperatures and rates sufficient to maintain the temperature of the air discharging from the coils at 20° C. Behind the cooling coils is a circulating fan of a size sufficient to circulate air from the basement of the building into the rectifying room at a rate of 320,000 cubic feet per minute. Sufficient cooling will be attained in a system of this size with air cooled at 20° C. if the air is circulated such that each diode will receive 40 cubic feet per minute air.

The cooling gas velocity is an important factor in the regulation of the internal temperature of the rectifiers contained in the system and depends in large measure on the characteristics of the rectifier cooling fins and the construction of the cooling orifices of the cubicles. Gas velocities of the order of from about 1000 to about 2000 feet per minute satisfactorily cool the rectifiers to desired temperatures in a system as described herein.

In the operation of the cooling system as hereinbefore described, power is supplied to the rectifying cabinets. The fan is energized and circulates air to the entire system at the rate of 320,000 cubic feet per minute. Water is circulated to the cooling coils located in the basement of the power room at between 15° C. and 17° C. A pressure differential exists between the rectifier room and the basement and is of the order of between about ¼ inch and 2 inches water pressure. The cooling air is circulated by the fan from the basement of the building into the rectifying room and due to the pressure differential existing between the air on the outside of the rectifying cabinets and that on the inside of the cabinets which are in communication with the basement of the building, the air is forced through the plurality of apertures or orifices on the rectifying cabinet walls into the basement. This air passing through the cabinet apertures does so at rates of 40 cubic feet per minute per aperture and consequently per diode. This equal flow of 40 cubic feet per minute per diode for the 7,920 diodes of this example is due to a constant air pressure differential and fixed orifice size for each diode in the system. In this manner the temperature differential between the diodes in the system is maintained at about 2° C.

As discussed previously, an important practical requirement of a large installation of semiconducting rectifiers is that all rectifiers carry their equal share of load. In normal operation a germanium diode has a forward voltage drop of approximately 0.5 volt and has a 60 volt reverse potential applied during the reverse or negative half cycle of the sine wave. The diode is therefore normally a high resistance element in the reverse direction. Temperature differentials between diodes cause variation in their internal resistance and consequent unequal load carrying capability among the different diodes. In addition, a temperature rise above the maximum safety value, e.g., 65° C. will eventually destroy these diodes.

When a germanium diode fails the diode almost always has become a low resistance element to either positive or negative potentials so that it no longer functions as a rectifier. By the cooling system of the present invention each individual germanium diode in each cabinet is cooled substantially to the same temperature, and no appreciable temperature differential exists between any two diodes in any one cabinet. In addition cooling is so conducted that no diodes in the system exceed the maximum safe temperature for the diode used. The exact temperature at which a diode will fail varies with the type and size of the diode used and the cooling system is easily adjusted by regulating the temperature of the coolant and the rate of flow so as to keep the diodes used within their designed safety limit.

While in this embodiment a set number of cabinets containing a set number of germanium rectifiers has been illustrated, it is, of course, obvious that the number of cabinets or the number of units contained in each cabinet may be changed without departing from the spirit or scope of the invention. The important thing is that the cooling be of a parallel nature, that is, that the cooling air pass each button in a parallel relationship so that each button will be cooled to substantially the same extent. Similarly, the shape of the cabinets may be changed or the diodes mounted on panels or walls instead of in cabinets so long as the provision or parallel cooling of the diodes be adhered to.

Another important feature of the system is the new and novel assembly involved in the installation of great numbers of semiconducting rectifiers. The cabinets or cubicles of the present invention are constructed and arranged so as to porform several vital functions.

The cubicles as shown in FIG. 3 are hollow structures having five air tight surfaces and one open surface 305, preferably the bottom. By connecting the bottom of such a cubicle to an air circulation system that provides an air pressure differential between the interior and the exterior of the cubicle, the cooling desired for the rectifier diodes carried on the cabinet is provided for. This is accomplished by providing a hole or orifice 306 on the walls of the cubicles corresponding to each semiconducting rectifier to be mounted on the cubicle. The orifices are fixed in size so that by suitably regulating the flow of cooling medium a metered quantity of the medium will contact each rectifier contained on a cubicle. The orifices may be round, elliptical, rectangular or any other shape as will best serve the flow pattern of the specific design of the rectifier cooling fins.

In addition to providing support for the rectifiers and metering the flow of cooling medium through the rectifiers, the cubicles may be constructed of an electrical insulating material such as wood planks, vulcanized fibre and other similar materials. When this is practiced the cubicles further provide electrical insulation to the rectifiers, the alternating current supply conductors, the direct current load conductors and ground connections. Each of these electrical units enumerated above are insulated one from the other economically by merely proportioning the spacing between each component on the insulated cubicle wall surface so as to withstand the magnitude of each potential difference encountered between respective components by supplying the necessary creepage distance between these components.

Mounting of rectifiers in cubicles of the type described may be accomplished on the inner wall surface or the outer wall surface. If the mounting is on the external surface each of the diodes is mounted in juxtaposition to one of the cooling medium orifices as is done when mounting is on the inner wall. Preferably, the bus bars, fuses and other electrical accessories may be assembled as a harness exterior to the cubicle, thus permitting ready accessibility to all the electrical equipment in case of repairs.

In accordance with a further embodiment of this invention means have been provided to avoid overload and consequent burn out of silicon or germanium semiconductor type rectifiers as a consequence of sudden and unexpected surges in voltage. Such surges are created by various phenomena such as lightning, switching operations and the like. They are particularly serious when the rectifier direct current output is connected to a load which draws power intermittently such as an elevator.

According to this invention it has been found that burn out of rectifier units from such surges may be eliminated or at least substantially minimized by maintaining a battery or other form of electrolytic cell between the positive and negative bus bars of the direct current output from the rectifiers and in parallel with the load. Such a system is shown diagrammatically in FIG. 2. As shown therein the rectifiers 214 provide direct current power and are connected respectively to positive bus bar 218 and negative bus bar 219. A load 220 which is permanently or intermittently connected across the bus bars and may comprise an elevator, a trolley motor, a bank of electrolytic cells or the like.

To avoid damage of the rectifiers from voltage surge an electrolytic cell or series of electrolytic cells 221 is connected in parallel with the load 220, the connection between the electrolytic cell and the rectifier being permanent. These cells may conveniently constitute a battery, such as a storage battery containing a liquid electrolyte, or series of battery cells which have a total voltage equal to the normal voltage between bus bars 218 and 219. Under normal operations the rectifier output D.C. voltage equals the cell or battery voltage. Consequently at normal voltage no appreciable current flows through the cells 221. However, when a sudden surge, usually of high magnitude but short duration occurs, the current flow of the cell 221 will increase many times for a small percentage voltage increase. This cell functions as a non-linear resistor load to provide a surge arrestor to absorb the surge energy but effectively prevents any increase in the alternating current potential applied to the diodes that are blocking the reverse alternating current potential at the instant that the surge occurs. Since, in actuality, high voltage surges of short duration are equivalent to a high frequency, low energy surge and are not capable of providing a substantial load current to the cells, the surge voltage is limited by the internal impedance of the transformer feeding the semiconductor rectifiers since the cell or battery exhibits an exceptionally low resistance load to any voltage exceeding its normal potential.

Battery or cell 221 is preferably designed to have a normal voltage substantially equal to or at least not less than 90 to 95 percent of the normal no load voltage of the system, i.e., power supply, rectifier circuits and transformer. Should the voltage of the battery exceed the no load voltage of the system it is of no particular consequence so long as the excess is within reasonable limits, for example, between 100 to 120 percent of the normal rectifier output voltage. Care should be taken to avoid utilizing cells or batteries whose voltage is substantially below the normal no load voltage of the system. Batteries or cells in this condition can be damaged by overcharging due to the normal no load rectifier voltage exceeding the normal battery voltage.

A further embodiment of the surge arresting mechanism presented herein involves the provision in the system of an element or means such as a rectifier or diode 222 in series with the battery or cell 221 which permits flow of current to the battery during surges but does not permit flow of current in the opposite direction. Diode 222 may conveniently comprise a germanium or silicon diode of the same general type employed in the rectification system and is positioned between the positive bus bar and the positive pole of battery 221. Diode 222 need not be as large as diodes employed in the rectifier circuits and thus its rated capacity is usually substantially below the capacity of diodes in the rectifier circuits. As shown in FIG. 2 this arrangement in a full wave rectifier circuit provides adequate protection of the diodes or rectifiers 214 in the system by providing instantly and automatically a low resistance path for voltage above the normal operating or load voltage of the system. Diode 222 is placed so that it is in series with the cell or battery 221 and the diode plus the battery are in parallel with the load.

Normally the voltage of the system at full load will be lower than the normal no load voltage of the system due to losses which occur in the transformers, rectifier circuits and the like. Rectifier or diode 222 will effectively prevent this difference in voltage from causing any feed back from the battery to the system during operation of the power source, or in the event of the loss of the alternating current power supply.

The device has been shown in FIG. 2 with reference to a six phase full wave bridge circuit for illustrative purposes only. Any number of phases may be employed in accordance with the invention. Thus single phase, two phase, three phase and other multiphase circuits may be protected utilizing this protection system with equal facility.

Figure 6:
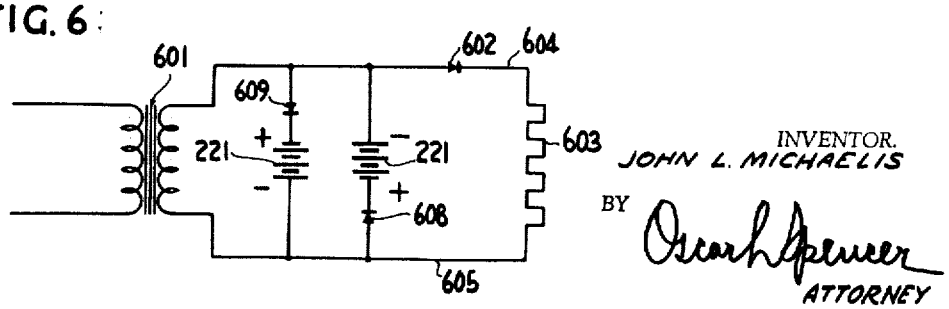
FIG. 6 is a diagrammatic illustration of a half-wave rectifier circuit with voltage surge protection applied.

If the protective means 221 be employed in a half wave rectifier circuit special precautions should be taken to provide adequate protection for such a system. Thus as seen in FIG. 6, there is shown diagrammatically a single phase, half wave direction current power system having an alternating current power source, transformer 601, a rectifier 602 and a load 603. Bus bars 604 and 605 carry direct current output to the load. Batteries or cells 221 are provided across the secondary winding of the transformer 601 in parallel with the load and each of the cells 221 has a rectifier 608 and 609 respectively, connected in series with them and in parallel with the load. Rectifiers 608 and 609 are poled in opposite directions as are the batteries 221. Provision of two oppositely poled batteries provides surge protection for the system at all times by providing a low resistance path for above normal operating voltages whether they occur while the circuit is conducting or at rest.

It is not necessary that the cells 221 be batteries. They can be other operative electrolytic cells responsive to rapid increase in voltage such as an electrolytic cell for electrolysis of sodium chloride and production of chlorine and caustic soda, or for production of hydrogen and oxygen or for generation of metallic aluminum, magnesium or sodium. In such a case the operating cells 221 are kept on the line continuously as part of the load, the remaining part being any suitable or desired character even comprising a second series of electrolytic cells. This second series may at times be disconnected to repair or replace one or more of the cells in the series without hazard to the rectifiers.

Care must be taken to avoid accumulated disconnection of cell or batteries 221 from the rectifiers while the rectifiers are operative. This is normally done by avoiding any disconnecting switches in the lines between the rectifiers and the cells 221, all means for deenergizing the rectifiers being on the alternating current side of the circuit.

While in discussing the voltage surge arresting device particular attention has been given to the operation of electrolytic cells and the application of protection to this type of operation, the invention is not limited to these applications. The voltage surge arresting system herein disclosed has particularly effective use in systems supplying a load usually in excess of 10 kilowatts such as elevator motors, trolley motors, electric locomotives and other similar electrical systems where power is drawn intermittently rather than continuously. Simply by selecting a battery or cell with the proper voltage rating for use in a given system and maintaining the battery or cell as a permanent load across the direct current output of the rectifier circuit supplying the motor with the battery cell in parallel with the load voltage, surge protection for surges occurring on the alternating current side of the power system is provided. The addition of a diode in series with the battery and the battery plus the diode placed in parallel with the load there will be provided further protection in preventing battery feed back to the load.

A further embodiment of the present invention involves the protection of the semiconducting diodes of the hereinbefore described system from excess reverse potentials. Semiconducting rectifier diodes such as a germanium rectifier may vary in their internal resistance in the reverse direction to a considerable extent. At values above a certain maximum a semiconducting diode will have an excessive reverse or leakage current to such a value that the diode will be destroyed.

In this embodiment provision is made to place a resistor in parallel across each diode in a bridge circuit higher than the forward resistance but less than the backward or blocking resistance of the diode. The resistor elements are of a low ohmage type of from 100 to 1000 ohms and act by their parallel connections to the diodes as a voltage divider for the reverse potentials for the diodes in any one series circuit.

The resistor, connected in parallel with the diodes of a bridge circuit, are tested and placed preferably so that the resistors in any one bridge circuit do not vary in value by more than one percent. The resistors are connected in series with each other and by virtue of their series and parallel connection control the reverse voltage division across the diodes rendering it substantially equal across each diode.

The resistor elements placed in parallel across the rectifier diodes of the present system should be of a magnitude such that they are from between about 15,000 to about 125,000 times the resistance of the semiconductor diode with which they are associated in the forward direction. The resistor elements further are of values such that they are from about $\frac{1}{3}$ to about $\frac{1}{20}$ of the resistance of the semiconductors with which they are associated in the reverse direction. In the circuits themselves the total resistance of the resistors in each circuit is substantially equal to the total resistance of the resistors present in each of the other circuits in the system.

With reference to FIG. 2 there can be seen the bridge circuit 201 with rectifiers 214 located therein. The bridge circuit 201 is shown having six bridge legs. Resistors 215 are shown connected in shunt across each rectifier in one bridge leg only but this is merely illustrative since similar resistor connections are placed across each rectifier 214 shown in the drawing. The resistors themselves are in series with each other.

By this arrangement the variation in the equivalent resistance to the applied reverse potential of any single diode and its associated parallel resistor in a circuit compared with any other diode and resistor combination in the same circuit is extremely small and voltage division is almost identical. Any variations that do occur are exceedingly small.

A further provision is made in the bridge circuits of the present invention for indicating failure of rectifier diodes in any bridge leg. As shown in FIG. 2 there are placed between direct current bus bars and the last resistor in a series a fuse, preferably of the order of 250 amperes but variable depending on the size of the bridge circuits employed and the maximum amperage to be carried by any one circuit.

Should the current in the circuit due to failure of the diodes and subsequent short circuit exceed the fuse amperage value the fuse will blow out. A suitable indicating lamp may be connected in parallel across the fuse so as to light when the fuse has blown, thus indicating diode failure in that bridge leg.

Protection from overload currents in high rated power systems of the type contemplated in accordance with this invention is a practical necessity since such currents can cause serious damage to system components. Current overloads occurring in systems of this type are quite often extremely high, representing for example, a 300 to 500 percent increase over the normal safe 100 percent current carried. High current overloads of this type exhibit extremely fast rates of such current increases requiring special equipment with high current interrupting capacity for adequate protection. Lower current overloads with slower rate of current increases are also encountered and require separate equipment for adequate protection of the system in the range of 100 to 300 percent current overloads.

In accordance with a further embodiment of the present invention complete protection of high rated direct current power sources is provided by a novel arrangement of system components and overload protecting devices. Thus, an alternating current power source is provided. A plurality of power transformers are connected in parallel to the alternating current source through their primary circuits. Each one of the power transformers is connected to a plurality of rectifier circuits through the secondaries of each of the transformers. Rectifier circuits employed in the contemplated power systems are of the semiconductor type employing semiconducting type diodes such as germanium or silicon rectifier diodes. The rectifier circuits are coupled in parallel to the power transformer secondaries.

Between the alternating current source and the primary windings of the power transformers disconnecting means are provided for opening the circuits supplying the transformer windings. A plurality of such circuit disconnecting means are generally employed to provide for adequate manual and automatic control and are suitably linked electrically with circuit control wiring so as to trip or open the disconnecting mechanisms in unison thereby shutting down the entire power system.

The rectifier circuits which are coupled in parallel to each of the transformers are arranged to provide direct current energy to a load, there being supplied for each plurality of circuits connected to a power transformer adequate bus bars and electrical connections to supply to a load the rectifier circuits direct current output.

High speed current limiting fuses are provided in series with each of the rectifier circuits. The direct current side of each group of rectifier circuits energized by a single power transformer are connected in parallel with a direct current output line. Each power transformer therefor provides electrical energy for a direct current output line. The direct current output lines are connected in parallel to a bus supplying direct current energy to a load. Current overload sensing devices are located in each of the direct current output lines to measure or detect current overload. The current overload sensing devices are designed to measure or detect currents in excess of a predetermined safe value, and to energize a control circuit, which in turn is utilized to de-energize all alternating current supply energy to the entire rectifier system.

The current overload sensing devices are overload relays and may comprise a contact making ammeter or any other standard electrical current measuring means which can register currents in excess of a predetermined safe value and respond thereto with a signal and/or actuate a control circuit. The current overload sensing devices located in the direct current output lines are all electrically linked by means of appropriate control circuit wiring to the alternating current power supply circuit breakers or disconnectors. The wiring which links all the circuit disconnecting devices of the power transformers is therefore directly connected with each of the current sensing means associated with the direct current output lines energized by the same power transformers. As will be readily apparent therefore any overload current which occurs in any of the direct current output lines of any one of the power transformers will be registered on the sensing device associated with that particular output line. An electrical control circuit energized by the device due to the overload current is carried by the control circuit wiring from the device or relay to the circuit disconnecting system where it energizes or actuates the trip coil and trip mechanism of the disconnecting means or circuit breaker thereby shutting off all current supply to the rectification system.

The 250 ampere, 250 volt, type 101F Amp-trap fuse manufactured by the Chase-Shawmut Company of Newburyport, Massachusetts, has been found particularly suitable in accordance with this invention as the current limiting fuse placed in series with the rectifier circuits. These devices are silver sand fuses having extremely fast fault clearing times. Thus at overloads of 300 percent or greater they interrupt circuits in less than a half of a cycle. Fault clearing times on the order of 0.0025 second or less are not unusual in devices of this type.

At overloads of between 100 percent up to about 300 percent high speed fuses of high interrupting capacity described above do not adequately protect the semiconductor diodes from failure due to such overloads. The overload current sensing means connected to the direct current output lines energized by the power transformers are utilized to register overloads in this range. A germanium diode can withstand this lower range of overload for several seconds and since the sensing means and its associated circuit disconnecting means respond in about one second to overloads in this range adequate protection provided.

Figure 8:
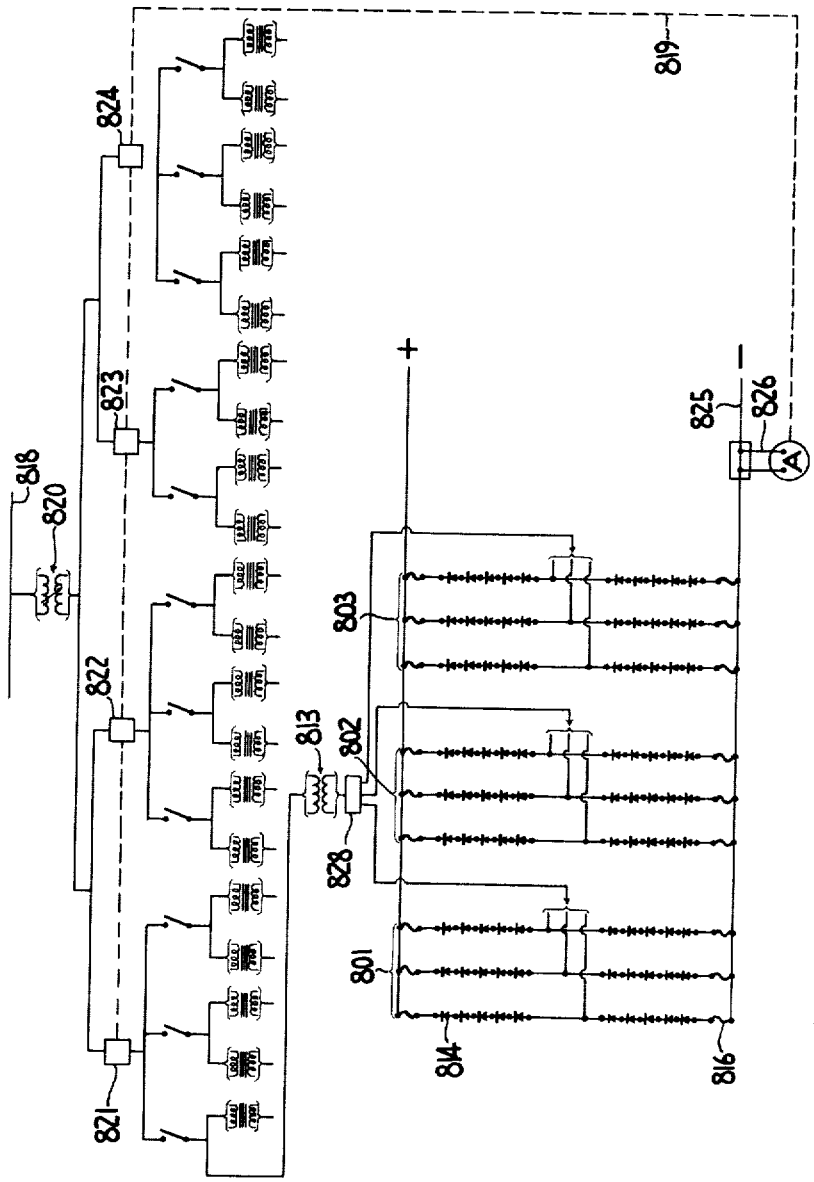
FIG. 8 is a diagrammatic illustration of a suitable circuit arranged to provide the desired rectification and provided with suitable current overload protection.

For a more complete understanding of the instant invention reference is made to FIG. 8 which shows an alternating current supply line 818, connected to a step down tap changing under load transformer 820. A plurality of power transformers exemplified by 813 are connected in parallel to the alternating current supply of transformer 820. Interposed between transformer 820 and the plurality of power transformers are a plurality of circuit breakers 821, 822, 823 and 824. Each power transformer as exemplified by 813 supplies a plurality of rectifier circuits 801, 802, and 803 employing therein a plurality of semiconductor type rectifier diodes 814. Positioned between power transformer 813 and rectifier bridges 801, 802 and 803 is a balancing autotransformer 823. Located on the direct current side of each series of diodes 814 is a current limiting fuse 816. Located on the direct current output line 825 is an overload current sensing means 826. Sensing means 826 is linked to all circuit disconnections 821, 822, 823 and 824, through control circuit wiring 819.

In operation should a high current fault arise such as through a short circuit sending an overload of, for example, 800 percent above normal rated current through the diodes the fuses 816 associated with the diodes through which the fault occurs will effectively interrupt the current before damage to the affected diodes occurs. If a low current overload occurs of the order of 200 percent above normal rated current it will be registered by sensing means 826. The signal from 826 is carried through circuit 819 and energizes the trip coils of circuit disconnections 821, 822, 823 and 824 within one second thereby adequately protecting the system since current overloads of this magnitude will not harm the semiconductor type diodes for 15 seconds or more.

While the present invention has been described with reference to the specific details of certain embodiments, it is not intended that such details shall be regarded as limitations on the scope of the invention, except insofar as included in the accompanying claims.

This application is a continuation-in-part of my copending applications, Serial No. 626,357, filed December 5, 1956, now Patent No. 2,881,383 and reissued as Re. 25,000; Serial No. 679,630, filed August 27, 1957, now Patent No. 3,052,840; Serial No. 688,890, filed October 8, 1957, now abandoned, and Serial No. 715,046, filed February 13, 1958, now abandoned.

What is claimed is:

1. In a process for controlling a direct current power source comprising a plurality of semiconducting rectifier circuits coupled in parallel and connected to an alternating current power source and connected to a direct current load and arranged to produce a direct current of amperage in excess of 10,000 amperes, each of said circuits having a plurality of semiconducting rectifiers therein connected in series, the total number of said rectifiers in parallel and in series being in excess of 1000, the improvement which comprises cooling all of said rectifiers by passing a cooling gas stream in contact therewith, the flow of gas with respect to each of said rectifiers being in parallel and returning the gas after such contact in a path out of contact with substantially all other diodes.

2. A direct current power source comprising a plurality of semiconducting rectifier circuits coupled in parallel and connected to an alternating current source of power and arranged to provide direct current of high amperage to a load, each of said parallel rectifier circuits having a plurality of semiconducting rectifiers therein connected in series, individual cooling air channels associated with each of said rectifiers, said channels communicating at their end with a common source of cooling fluid and discharging the cooling fluid into contact with the rectifier, a fluid cooler in the path of the coolant fluid beyond the rectifier and means for circulating cooling fluid from said common source through the channels past the rectifier unit and to the cooler in a path out of contact with substantially all other diodes, and for returning cooled fluid to the common source, the size of each channel being substantially the same whereby substantially the same amount of fluid content is delivered to each individual rectifier.

3. The process of claim 1 wherein the internal temperature of the semiconducting rectifiers within its enclosure is maintained between about 50° C. and about 65° C.

4. The process of claim 1 wherein the cooling liquid employed is air.

5. A direct current power source comprising a plurality of semiconducting rectifier circuits coupled in parallel and connected to an alternating current source of power and arranged to produce direct current of high amperage to supply direct current energy to a load, each of said circuits having a plurality of semiconducting rectifiers therein connected in series, said rectifiers being mounted on an insulating supporting wall, orifices in said wall of substantially uniform size opposite each rectifier and means for circulating a cooling fluid from a common source through each orifice and into cooling contact with the rectifier opposite said orifice and returning the gas after such contact in a path out of contact with substantially all other rectifiers.

6. In a process for controlling a direct current power source comprising a plurality of semiconducting rectifier circuits coupled in parallel and connected to an alternating current power source and arranged to produce a direct current of high amperage to a load each of said circuits having a plurality of semiconducting rectifiers therein connected in series, the total number of said rectifiers being in excess of 100, maintaining the temperature of the rectifiers in said circuits sufficiently uniform so that the differential between any two thereof is not in excess of 5° C.

7. The process of claim 5 wherein the gas employed is air.

8. A direct current power source comprising a plurality of semiconducting rectifier circuits coupled in parallel and connected to an alternating current source of power and arranged to produce direct current of high amperage, to supply direct current to a load, each of said circuits having a plurality of semiconducting rectifiers therein connected in series, a plurality of impedances, one impedance connected in shunt across each semiconducting rectifier in a series, said impedances being in series with each other.

9. The apparatus of claim 8 wherein the impedances are resistors and the resistors are from about 15,000 to about 125,000 times the forward resistance of the semiconducting rectifiers across which they are connected.

10. The apparatus of claim 9 wherein the resistors are from about ⅓ to about ½₀ the back resistance of the semiconducting rectifiers across which they are connected.

11. The apparatus of claim 9 wherein the total resistance in one circuit is substantially equal to the total resistance of the resistors in each of the other circuits.

12. The apparatus of claim 10 wherein the total resistance in one circuit is substantially equal to the total resistance of the resistors in each of the other circuits.

13. A direct current power source comprising a plurality of semiconducting rectifier circuits coupled in parallel and connected to an alternating current source of power and arranged to produce direct current of high amperage to supply direct current to a load, each of said circuits having a plurality of semiconducting rectifiers therein connected in series, a plurality of fuses, one for each series arrangement of rectifiers, said fuses being located between the last rectifier in a series and the direct current bus bars, a plurality of resistors, one resistor being connected in shunt across each rectifier in a series, said resistors being connected in series.

14. The apparatus of claim 8 in which the number of rectifiers exceeds 100.

15. An alternating current power source, a plurality of transformers the primary circuits of which are connected in parallel with said alternating current power source, each secondary of said transformers being connected with a plurality of semiconducting rectifier circuits, a current limiting fuse in series with each rectifier circuit, the direct current side of each group of rectifier circuits energized by a single transformer being connected in parallel with a direct current output line, each transformer thus providing a direct current output line, said lines being connected in parallel to a bus supplying a direct current load, a current sensing device in each of said lines capable of detecting an overload surge of current and means for automatically disconnecting the primary circuits of all of said transformers from said alternating current power source, said means being responsive to each of said current sensing or overload means.

16. The apparatus of claim 15 wherein there are at least 3 rectifier circuits.

17. The apparatus of claim 15 wherein there are at least 3 power transformers.

18. The apparatus of claim 15 wherein said current limiting fuse is responsive within 0.05 second.

19. In a process for controlling a direct current power source comprising a plurality of parallel connected semiconducting rectifier circuits connected in association with an alternating current power source, and connected to a direct current load to produce a direct current of amperage in excess of 10,000 amperes, each of said circuits having a plurality of semiconducting rectifier diodes therein connected in series, the total number of said diodes in parallel and in series being in excess of 1000, the improvement which comprises cooling the diodes by passing cooled gas into contact with each individual diode in parallel and returning the gas after such contact to a cooling zone in a path out of contact with substantially all of the other diodes and thereby maintaining the temperature of the diodes in said circuits sufficiently uniform so that the differential between any two thereof is not in excess of 5° C.

References Cited in the file of this patent
UNITED STATES PATENTS

| | | |
|---|---|---|
| 1,810,395 | Engle | June 16, 1931 |
| 2,126,790 | Logan | Aug. 16, 1938 |
| 2,394,060 | Holmes | Feb. 5, 1946 |
| 2,412,989 | Kotterman | Dec. 24, 1946 |
| 2,423,134 | Winkler | July 1, 1947 |

(Other references on following page)

UNITED STATES PATENTS

| | | |
|---|---|---|
| 2,444,458 | Master | July 6, 1948 |
| 2,516,184 | Christie | July 25, 1950 |
| 2,628,340 | Potter | Feb. 10, 1953 |
| 2,728,042 | Ruhland | Dec. 20, 1955 |
| 2,813,243 | Christian et al. | Nov. 12, 1957 |
| 2,925,545 | Fischer | Feb. 16, 1960 |
| 2,927,250 | Scharli | Mar. 1, 1960 |
| 2,982,904 | Koppelmann | May 2, 1961 |

FOREIGN PATENTS

| | | |
|---|---|---|
| 289,568 | Great Britain | May 2, 1928 |
| 643,065 | France | May 10, 1928 |

UNITED STATES PATENT OFFICE
CERTIFICATE OF CORRECTION

Patent No. 3,098,963 July 23, 1963

John L. Michaelis

It is hereby certified that error appears in the above numbered patent requiring correction and that the said Letters Patent should read as corrected below.

Column 2, line 67, for "of", second occurrence, read -- or --; column 5, line 75, for "of" read -- for --; column 16, line 25, after "protection" insert -- is --.

Signed and sealed this 5th day of January 1965.

(SEAL)
Attest:

ERNEST W. SWIDER
Attesting Officer

EDWARD J. BRENNER
Commissioner of Patents